US00RE33889E

United States Patent [19]

Gaeumann et al.

[11] E Patent Number: Re. 33,889

[45] Reissued Date of Patent: Apr. 21, 1992

[54] SEWING MACHINE

[75] Inventors: Alfred Gaeumann, Steckborn; Otto Hangarter, Oehningen/Wangen; Otmar Stillard, Steckborn, all of Switzerland

[73] Assignee: Fritz Gegauf AG Bernina-Nahmashinenfabrik Seestrasse, Steckborn, Switzerland

[21] Appl. No.: 536,008

[22] Filed: Jun. 8, 1990

Related U.S. Patent Documents

Reissue of:

[64] Patent No.: 4,817,547
Issued: Apr. 4, 1989
Appl. No.: 148,300
Filed: Jan. 25, 1988

[30] Foreign Application Priority Data

Jan. 28, 1987 [CH] Switzerland ..... 00291/87

[51] Int. Cl.[5] ..... D05B 3/02

[52] U.S. Cl. ..... 112/457; 112/445; 112/458

[58] Field of Search ..... 112/457, 458, 456, 453, 112/121.11, 121.12, 275, 277, 258; 439/138

[56] References Cited

U.S. PATENT DOCUMENTS 4,052,946 10/1977 Rydz et al. ..... 112/445
4,055,131 10/1977 O'Brien et al. ..... 112/445
4,203,378 5/1980 Giesselmann et al. ..... 112/457
4,329,933 5/1982 Beckerman et al. ..... 112/457
4,406,235 9/1983 Eguchi ..... 112/458 X
4,475,784 10/1984 Lukawich ..... 439/138
4,672,904 6/1987 Kato et al. ..... 112/457
4,703,432 10/1987 Muller ..... 112/457 X

*Primary Examiner*—Peter Nerbun
*Attorney, Agent, or Firm*—Marks Murase & White

[57] ABSTRACT

A sewing machine having associated modules which can be inserted [at will] and which are interchangeable in a guide of the housing of the machine. The front side of the plate-shaped modules is visible in the inserted condition of the module and is provided with stitch symbols to which are assigned numbers. On the inside of the modules are arranged memories, preferably in connection with [a microprocessor, which are in connection with] the microprocessor of the sewing machine when the modules are inserted. By means of keys and a display, the number corresponding to the desired stitch sort can be selected and the control data from the memories of the module will be recalled in the microprocessor of the sewing machine and then used for operation of the sewing machine. [By means of simple, strong modules of an advantageous price, even an unskilled operator can select and recall any number of stitch sorts in a simple and safe way when the module with the desired sort of stitch is inserted and the corresponding number is selected.]

10 Claims, 3 Drawing Sheets

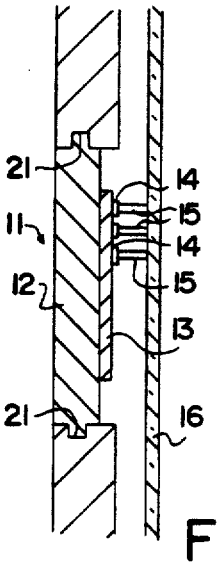
FIG. 2
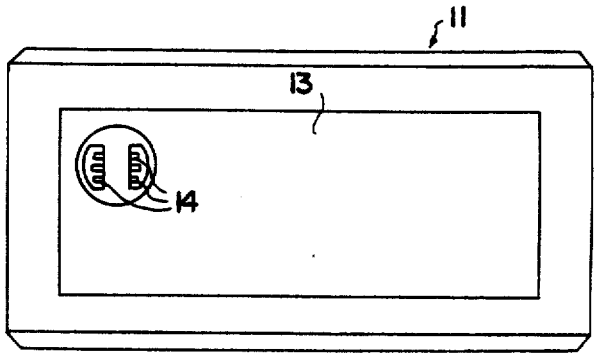
FIG. 3
FIG. 4
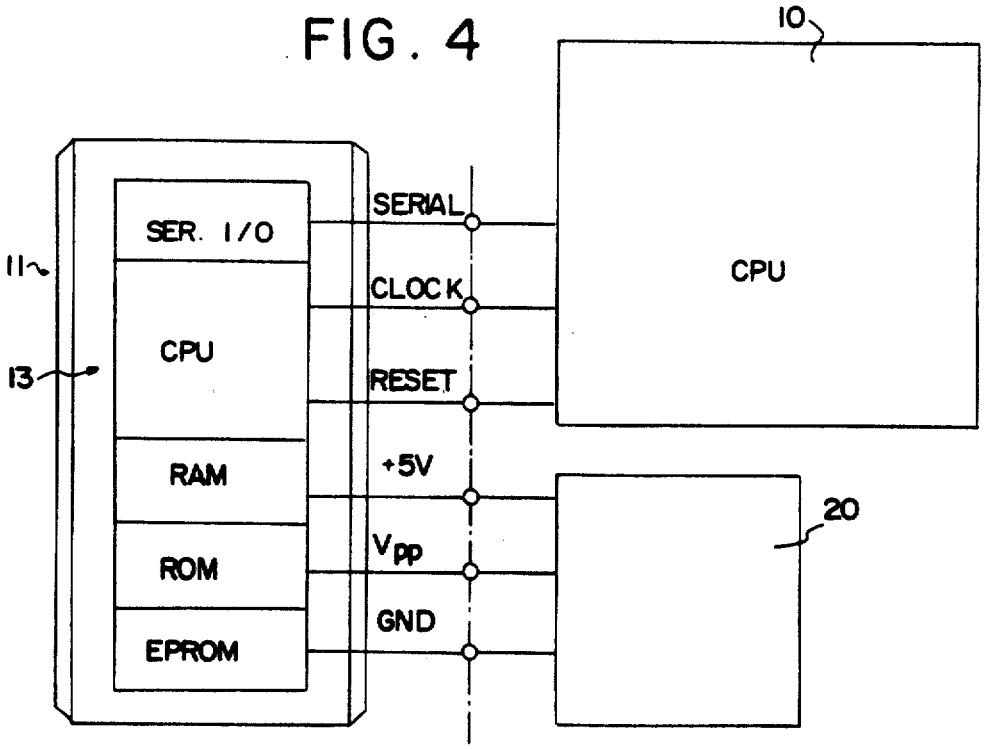

SEWING MACHINE

Matter enclosed in heavy brackets [ ] appears in the original patent but forms no part of this reissue specification; matter printed in italics indicates the additions made by reissue.

BACKGROUND OF THE INVENTION

The present invention relates to a sewing machine with electronic stitch pattern control, whereby memories containing control data are interchangeably provided at the sewing machine. Such sewing machines with interchangeable storage units are known but there has not been proposed a solution for providing a simple, safe interchange of the memories and a safe assignment and selection of the desired stitch pattern by operators, such as housewives.

It is known to equip the sewing machine with a separate electronic control module, which module comprises operating elements, more particularly keys for the selection of the desired function of the machine (U.S. Pat. No. 4,055,131). In this case, the objective is to simplify the construction of the sewing machine, and to have the machine operated by a skilled operator but not needing an interchange by the operator. A similar solution is known from U.S. Pat. No. 4,406,235 whereby the modules are in the form of complete panels which may be connected at will with a fundamental execution of the sewing machine. In this case, the connection is done by a cable. Also in this case, one aims at a simplification of the production of different models of sewing machines. An interchange of the module by the owner of the machine or by the operator is not foreseen nor possible.

Similarly, U.S. Pat. No. 4,203,378 shows a sewing machine with an interchangeable storage unit for different stitch patterns. This storage unit consists of an even plate which is inserted in a recess of the case of the machine and covered by a cover. As the storage unit is an integral part of the manufactured machine, an interchange of the storage unit by the operators is not envisaged. It is solely intended, if further development of the machine is desired to adapt only the storage unit but not the whole electronics.

It is also known to provide a slit in the sewing machine for a cartridge containing data for controlling determined programs (U.S. Pat. No. 4,475,784). However, when inserted, the cartridge is not visible at all so that a simple, safe interchange of a desired program at the cartridge connected with the sewing machine is not possible.

SUMMARY OF THE INVENTION

Consequently, it is an object of the present invention to realize interchangeable units low in price and easy to handle for a plurality of different stitch patterns which may be interchanged by technically non skilled operators and which permit a clear assignment of the stored control data to determined stitch patterns. This object is achieved by providing at least one module free of operating elements which is foreseen as a support for data as well as also for stitch symbols assigned to the data and which is capable of being connected to the sewing machine while the symbols remain visible, allowing the data to be recalled from the module by means of the electronics of the sewing machine. The module is very simple in that it is free of operating elements and it remains visible in its condition connected with the sewing machine so that stitch symbols provided on the module as well as numbers assigned to these symbols remain visible. More particularly, when many modules are provided, a confusion due to wrong assignment is excluded. The selection of a new kind of stitch can take place without having to remove the module from the sewing machine.

Preferably, the module comprises a plate provided on one side with the storage units and stitch symbols on the other side. This module may be inserted in an appropriate guide of the case of the sewing machine, whereby terminals of the storage unit lying inside come in contact with terminals of the sewing machine, while the stitch symbols provided at the outer side remain visible.

It is further preferable to provide the module with a microprocessor, more particularly to provide the module with a microprocessor card (smart card). In this case a serial transmission of data between the microprocessor of the module and the microprocessor of the sewing machine is possible, which permits relatively few connecting wires and terminals. This strongly contributes to the simplification of the module and to its utilization according to the invention.

The invention will be described further by way of an example of execution illustrated in the drawings.

BRIEF DESCRIPTION OF THE DRAWINGS

FIG. 2 shows a partial cross section through the module inserted in the machine and its support, FIG. 3 shows a back view of the module, FIG. 4 shows a circuit diagram of the electronics.

DETAILED DESCRIPTION OF THE INVENTION

Figure 1:
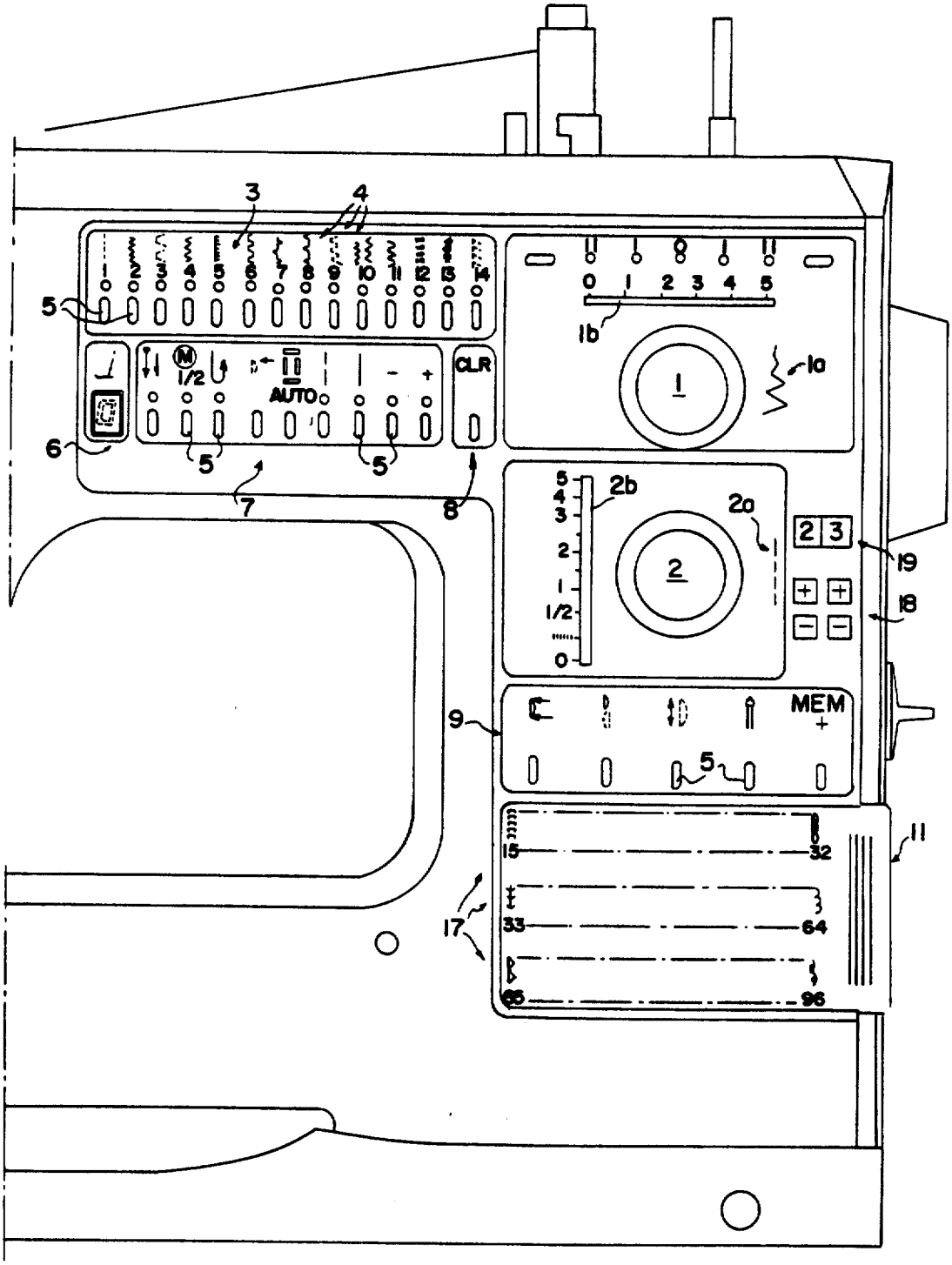
FIG. 1 shows a partial view of the machine.

The operating and display field of the sewing machine shown in FIG. 1 comprise adjusting knobs 1 and 2 for the stitch width and stitch length, which are indicated by the symbols 1a and 2a. Electronic display beams 1b and 2b show the adjusted stitch width and stitch length.

Utility stitches 4 are illustrated in a zone 3, these utility stitches being capable of selection by actuation of the corresponding key 5. Further displays and operating groups 6–9 for determined stitch sorts and functions are illustrated accordingly. Essential to the system is that there is provided in the sewing machine a microprocessor 10 (FIG. 4) in which memories containing data for controlling the stitch length and stitch width of the desired sewing operation are present. Preferred values for the stitch length and stitch width for determined sewing operations may be stored in these memories and these values may be indicated by blinking elements of the displays 1b and 2b. Besides the mentioned utility stitches 4, it is possible to store certain ornamental stitches particularly often used. Preferably, however, all control data for ornamental stitches are accomodate on easily interchangeable modules 11 which may be interchangeably inserted in a guide of the case of the sewing machine. As shown in FIGS. 2 and 3, each module 11 consists of a plate 12, preferably of synthetic material, on whose back a microprocessor card (smart card) 13 is rigidly connected. On this card 13 a microprocessor is provided and the card comprises terminals 14. When the module is inserted, as shown in FIGS. 1 and 2, these terminals 14 are in connection with contact springs 15 of a contact support 16 provided in the sewing machine. The support 16 may be a printed circuit board of the electronics of the sewing machine. As shown in FIG 1, ornamental stitches 17 with associated numbers are illustrated on the front side of the plate 12 of each module. These numbers may be selected by a keyboard 18 and a corresponding display 19 on the case of the sewing machine in order to recall the data corresponding to the stitch patterns designated by this number and for controlling the sewing operation accordingly.

As shown in FIG. 4, the microprocessor of the module 11 is fed through three lines by the power supply 20 of the sewing machine. The individual components of the microprocessor of the module 11 do not call for a further description. The transmission of data from one of the memories of the module 11 to the microprocessor 10 of the sewing machine takes place through a serial interface, whereby means are provided in order to adapt the CPU (central processing unit) of the module to the CPU of the sewing machine. As already mentioned, this arrangement in the operating mode permits reduction of the number of terminals which in turn permits a simple, strong and thus safe operating device. Also, no extreme precision is required in the positioning of the module in the guide of the sewing machine. FIG. 2 shows a simple guide in form of grooves 21 of an opening of the sewing machine housing and the operating position of the module is determined by abutment of the latter against the internal edge of the opening.

The illustrated and described embodiment permits an extremely simple interchange of a module with another item. It is thus possible to put at the disposal of the sewing machine owners any number and selection of stitch patterns or of modules, whereby new modules may be always at the owner's disposal and which can be bought at a relatively advantageous price by the owner of the machine and inserted in the machine when needed. Also when the owner of the machine uses many modules, confusion is not possible because the kinds of stitches are directly illustrated on the modules and because a particular number is assigned to them. The illustration of the stitch patterns nd of the assigned numbers always remain visible even when the module is fully inserted in the machine so that mistakes and confusion are practically avoided.

Other executions are also possible. The additional module 11 may contain not only data for ornamental stitches but also for additional utility stitches or other machine operations. As the case may be, the modules may comprise only memories which can be connected as additional memories to the microprocessor of the machine. Each module could also be provided with relatively strong pin terminals which are inserted in socket terminals of the sewing machine for connecting the latter with the module. In this case, it would not be necessary to have an opening with guides for receiving a module in the housing of the sewing machine. However, the non-planar configuration of the modules would be disadvantageous.

Figure 5:
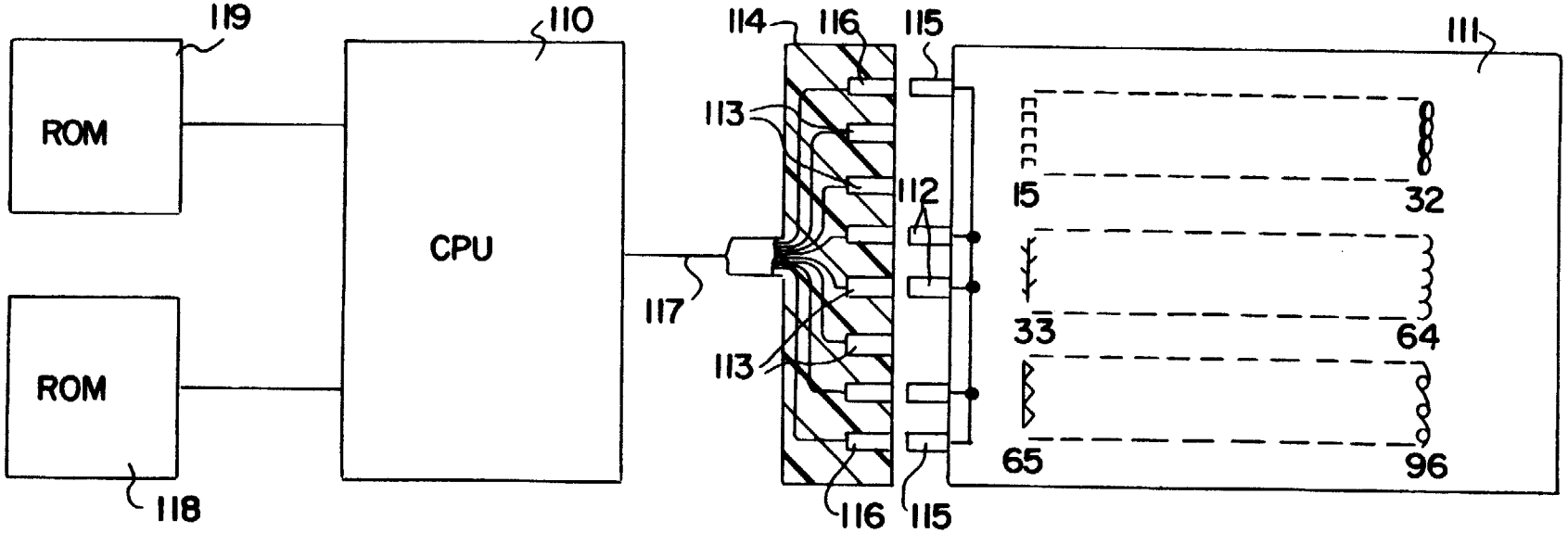
FIG. 5 shows schematically parts of a second example of execution.

The execution according to FIG. 5 allows a further simplification in that the module is in the form of a card 111, the front side of which is shown in FIG. 1, having illustrations of the stitch patterns capable of selection and of the assigned numbers. At one side of the card 111, pin terminals 112 are provided and arranged according to a coded configuration and which are capable of being inserted in socket terminals 113 of a code reader 114. The card 111 further comprises pin terminals 115 which are capable of being inserted in socket terminals 116 in order to provide a safe plug-in connection of the card with the code reader 114. The socket terminals 116 are connected with a common line and the pin terminals 112 are electrically connected to all existing pin terminals 112, as shown in FIG. 5. According to the number of arrangement of the pin terminals 112, and when the card is inserted, the code signals assigned to this card are delivered to the socket terminals 113, through a cable 117, to the CPU 110 of the sewing machine. As shown in FIG. 5, a ROM memory 118 is associated with the CPU 110. The memory 118 contains data for the control of fixed programs in the machine. A second, additional ROM memory contains data for the control of different kinds of stitches which are illustrated on the card 111. The card, instead of having code pin terminals 112, may be provided with a bar code identifying the card. This bar code could be read by a corresponding code reader when the card is inserted. When the card is inserted, it is possible by means of the keyboard 18 to select the number of the desired stitch pattern illustrated on the card. Then, the microprocessor of the sewing machine determines the location in the memory which corresponds to the card characterized by its code, and by the selected stitch pattern on this card, it controls the sewing machine by means of the memorized data. While more dead memories are in this case, such memories are cheap when the microprocessor on the module is suppressed. If a bar code or similar device is on the card, every electrical connection between the module and the sewing machine can also be suppressed.

We claim:

1. A sewing machine having an electronic stitch pattern control comprising memories containing electronic control data for a number of stitch patterns and a processor for control of the sewing machine by selected control data recalled from the memories of the sewing machine, at least one additional module having two surfaces mechanically attachable and electrically connectable to the sewing machine with at least one surface of the module visible when attached to the sewing machine, the module comprising memories with electronic data for a number of additional stitch patterns, each of the additional stitch patterns having an illustration associated therewith on the visible surface of the module and a code visible on the surface being associated with each of the stitch pattern illustrations, means on the sewing machine for selecting any desired stitch pattern by selecting and indicating the code associated thereto for recalling electronic data associated with the selected stitch pattern from the memories of the module by means of the processor of the sewing machine.

2. A sewing machine according to claim 1, wherein the module is provided with RAM and ROM memories and the data can be recalled from the memories by means of the electronics of the sewing machine.

3. A sewing machine according to claim 2, wherein the module comprises a plate having two sides, on one side with the RAM and ROM memories and on the other side with stitch symbols.

4. A sewing machine according to claim 3, wherein the plate is connected with a front wall of the housing of the sewing machine so that the plate is held near the front wall while being still visible.

5. A sewing machine according to claim 3 or 4, wherein the module is provided with a microprocessor.

6. A sewing machine according to claim 5, wherein a support of the module is provided on one side with a microprocessor card (smart card).

7. A sewing machine according to claim 5, wherein the transmission of data from the module to the microprocessor of the sewing machine occurs through a serial interface.

8. A sewing machine according to claim 1, wherein the module is provided with a code which designates the stitch patterns, a reader for the code is provided in the sewing machine, ROM memories for control data are provided in the microprocessor of the sewing machine, means for input of data designating a stitch pattern are provided in the sewing machine and means are provided to recall by means of the code and the data designating a stitch pattern, the control data from the location in the memory corresponding to the stitch pattern.

*9. A sewing machine having an electronic stitch pattern control comprising:*

*a memory containing electronic control data for a number of stitch patterns and a microprocessor for control of the sewing machine by selected control data recalled from said memory;*

*a module having two surfaces mechanically attachable to the sewing machine, said module having at least one surface visible when attached to the sewing machine, said visible surface having thereon stitch pattern illustrations, each of said illustrations being associated with a corresponding stitch pattern command;*

*said module further comprising a code for designating the module;*

*said sewing machine further comprising a reader for reading the code; and*

*said microprocessor further including a ROM memory for control data associated with said microprocessor, means for inputting data designating a stitch pattern, and means responsive to said code for recalling control data in said ROM memory corresponding to a stitch pattern on said module.*

10. A sewing machine according to claim 9, wherein the module has no digital memory.

* * * * *

UNITED STATES PATENT AND TRADEMARK OFFICE

CERTIFICATE OF CORRECTION

PATENT NO. : Re. 33,889

DATED : April 21, 1992

INVENTOR(S) : GAEUMANN ET AL.

It is certified that error appears in the above—identified patent and that said Letters Patent is hereby corrected as shown below:

Title page:

Item [75] Inventors, should be corrected as follows:

Alfred Gaeumann, Steckborn, Switzerland; Otto Hangarter, Oehningen/Wangen, Germany; Otmar Stillard, Steckborn, Switzerland Signed and Sealed this Seventeenth Day of August, 1993

Bruce Lehman

*Attest:*

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : RE 33,889

DATED : April 21, 1992

INVENTOR(S) : GAEUMANN et al.

It is certified that error appears in the above—identified patent and that said Letters Patent is hereby corrected as shown below:

Title page,

Item [73] Assignee should be corrected as follows:

Fritz Gegauf AG
Bernina - Naehmaschinenfabrik
Seestrasse, Steckborn, Switzerland Signed and Sealed this Twenty-eighth Day of June, 1994

*Attest:*

Bruce Lehman

BRUCE LEHMAN

*Attesting Officer*

*Commissioner of Patents and Trademarks*